Patented July 27, 1948

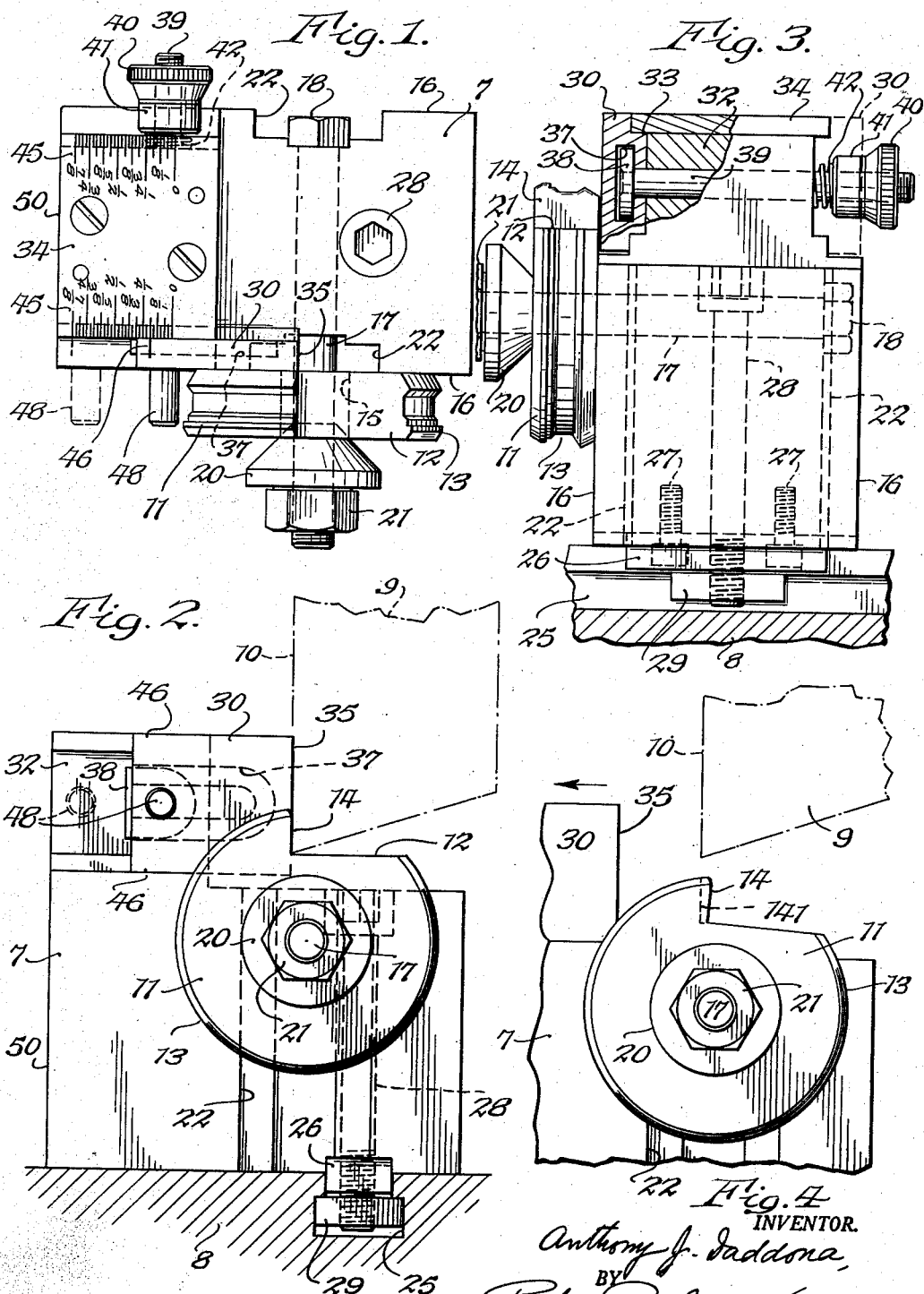

2,446,128

UNITED STATES PATENT OFFICE 2,446,128

FORM TOOL FIXTURE

Anthony J. Daddona, Elmira, N. Y., assignor to Hardinge Brothers, Inc., Elmira, N. Y.

Application July 28, 1944, Serial No. 547,030

3 Claims. (Cl. 51—218)

This invention relates to improvements in fixtures for use in connection with the forming of cutting edges on form tools of the circular or cylindrical type.

Form tools of this type are made by forming on the peripheral surface of a disk or cylindrical body a contour or profile corresponding substantially to the contour to be cut on a workpiece in a lathe, and after this contour has been cut on the peripheral surface of the cylindrical body, a portion of the peripheral surface of the body is cut away, forming a gash therein. This gash usually has two surfaces, one of which intersects the periphery of the form tool in such a manner as to form with the periphery a cutting edge, and this cutting edge is generally parallel to a plane in which the axis of the form tool lies, and spaced from this plane so that the angle between the surface forming the cutting edge and the immediately adjacent peripheral part of the cutting tool will be less than 90 degrees. For operation on different types of work, this angle may be less than 90 degrees to various extents. Consequently, this angle is important and must be properly formed, in the first place, and then must be correctly maintained during the regrinding or sharpening of the tool. Heretofore the maintenance of this angle has been difficult and failure to correctly maintain this angle has been a frequent source of trouble in connection with the use of form tools of this type.

One of the objects of this invention is to provide a fixture by means of which form tools of various types and sizes can be easily and correctly mounted in correct relation to an edge cutting implement.

A further object is to provide a fixture of this type which may be mounted on the movable bed plate of a grinding machine and on which form tools of various types and sizes may be mounted in correct relation to the edge cutting implement. A further object is to provide a fixture of this type with scale means for facilitating the correct forming of the cutting edge on form tools of different kinds. A further object is to provide a fixture of this type with means of improved construction for correctly positioning and centering the form tool on the fixture. Other objects and advantages of this invention will appear from the following description and claims.

In the accompanying drawings which illustrate by way of example one embodiment of this invention:

Fig. 1 is a top plan view of a fixture embodying this invention having a form tool mounted thereon.

Fig. 2 is a side elevation thereof showing the fixture mounted on the table of a grinding machine.

Fig. 3 is an end view thereof, partly in section.

Fig. 4 is a fragmentary side elevation similar to that shown in Fig. 2, but showing the parts of the fixture is different positions.

The fixture includes a body portion 7 which is so formed that it may be accurately and securely mounted on the table 8 of a machine for forming the cutting edge of the form tool. This machine may be a milling machine for initially cutting the gash in a form tool during the manufacture thereof, or a grinding machine for re-sharpening a form tool. In Figs. 2 and 4, 9 represents a grindstone of the cup-shaped type having a grinding edge 10 for use in re-sharpening a form tool 11 mounted on the body portion 7, but it will be understood that the grinding element 9 may be replaced by a milling cutter or other implement for initially cutting a gash 12 in the form tool to form a surface 14 which at its outer edge forms with the periphery of the form tool the cutting edge of the tool. The periphery 13 of the form tool may have any desired contour or profile cut therein. The angle between the surface 14 and the periphery of the form tool is important and may vary with different types of work on which the form tool is used, and this angle is usually determined by the distance of the surface 14 from an axial plane of the form tool, i. e. a plane in which the axis of the form tool lies, and which extends parallel to the surface 14.

Since the fixture may be used with form tools of many different shapes, sizes, lengths and diameters, means of improved construction are provided for securing the form tool to the body portion of the fixture 7, which securing means are applicable to various types of form tools. These form tools are always provided with a central aperture 15 by means of which they may be secured on a tool support of a lathe, and the form tools are also provided on either face thereof with suitable means by which the form tool can be held against turning when in use, but for sake of clarity these parts of the form tool are omitted from the drawings.

The means for securing a form tool on the body portion of the fixture, in the particular construction illustrated by way of example, include a bolt 17 arranged in an accurately formed hole extending crosswise of and perpendicular to the opposite faces 16 of the body portion 7, which faces are perpendicular to the base of the fixture. This bolt 17 may be provided at one end thereof with a head 18 formed to seat in a recess or depression in a side of the body portion to hold the bolt against turning. Since the internal bores 15 of various form tools differ in diameter, I provide on the bolt 17 a frusto-conical plug 20 which is accurately formed to slide lengthwise on the bolt 17 and the frusto-conical surface of which will engage the adjacent end or edge of the bore of the form tool. The end of the bolt 17 is threaded to receive a nut 21 by means of which the plug 20 may be forced into engagement with the form tool. By means of this construction, the form tool will be accurately centered with reference to the bolt 17 and will be pressed against an accurately formed surface 16 of the body portion of the form tool. It will be noted that both sides 16 of the body portion are provided with recesses to receive the head 18 of the bolt so that the form tool may be applied to either side of the body portion. The body portion is also provided with a recess 22 on each side thereof, into which any boss, clutch or holding parts, or other projections of the form tool may extend.

The hole through which the bolt 17 extends is accurately formed so as to lie parallel to the bottom of the body portion, and the body portion is also provided with means for assuring accurate mounting of the same on the work supporting table of the machine on which the fixture is used. Since the work supporting tables are usually provided with T-slots 25, the bottom of the body portion 7 may, for example, be provided with a locating key 26 suitably secured thereto, for example, by means of screws 27, the locating key being of such width as to fit snugly in the upper portion of a T-slot 25. In order to secure the fixture to the work supporting table, a clamping bolt 28 may be provided which extends downwardly through the body portion and the locating key 26 and engages with a nut 29 in the key slot 25. Any other means for securing the fixture to the work supporting table of a machine may be provided, if desired.

In order to determine the correct location of the surface 14 with reference to the axis of the form tool, I preferably provide a gage which, in the construction illustrated, includes a slide member 30 arranged to slide horizontally on the body portion 7, for example, on an upwardly extending part 32 thereof. This upward extension is preferably provided with suitable guideways at opposite sides thereof for the slide 30, and in the construction illustrated, see particularly Figs. 2 and 3, the slide has a part 33 extending into a recessed portion of the upward extension 32, this recessed portion being in part formed by means of a top plate 34 secured to the upper end of the extension 32. The slide may be of any suitable or desired construction and has an outer straight face or edge 35 which is so formed on the slide that in all positions of the slide the gage edge 35 will lie parallel to the cut to be made in the form tool. In the construction illustrated, the straight edge 35 will be parallel to the cutting edge 10 of the cup grinding implement. This slide may be releasably held or clamped in any desired position by any suitable means, and in the construction shown for this purpose, the slide on its inner face has a T-slot 37 into which a head 38 of a bolt 39 extends, the other end of the bolt being threaded and having a knurled nut 40 thereon which engages a spring retainer 41 cooperating with a coil spring 42. Consequently, by turning the nut 40 in a direction to compress the spring 42, the slide will be frictionally held in place on the extension 32 of the body of the fixture with any desired tension. Any other means for releasably holding the slide in the desired position may be employed.

Suitable scale means are preferably employed to indicate the position of the straight edge 35 of the slide with reference to a radial plane parallel to the straight edge in which the axis of the form tool lies, and in the particular embodiment of the invention illustrated, suitable scales 45 are formed along opposite edges of the top plate 34 of the fixture, and the slide has a graduation or index mark 46 thereon which is so positioned with reference to the scale that when the edge 35 of the slide lies in the axial plane of the form tool, the index mark 46 will be in alignment with the zero indication on the adjacent scale 45. The slide may be used at either side of the fixture by removing it from one side and inserting it in the corresponding guideway on the other side of the upwardly extending part 32, and consequently, the slide is preferably provided with index marks 46 on the upper and lower faces thereof to cooperate with either scale on the top plate 34. In order to facilitate the manipulation of the slide, a post or handle 48 is preferably secured thereto.

In the use of this fixture, after the same has been correctly mounted on the movable work supporting table of a machine, and a form tool 11 has been loosely mounted on the fixture, so that the form tool may be turned, the slide 30 is moved over into a position for alignment with the surface 14 of the form tool. Most form tools have stamped or etched thereon the distance of the surface 14 from an axial plane of the form tool parallel thereto, and if such indication is on the form tool, then the slide 30 is adjusted so that the index or pointer 46 thereon lies opposite the corresponding dimension of the adjacent scale. The form tool is then turned about its axis so that the surface 14 thereof will lie beyond the straight edge 35 of the slide to the extent to which it is desired to grind off the face 14. In other words, the form tool is turned to the right or clockwise from the position shown in Fig. 2 so that all of the worn part of the cutting edge of the form tool will lie beyond the straight edge 35, thus indicating the new edge 141 shown in broken lines in Fig. 4. The form tool is then tightly clamped in this position, and the slide 30 moved back into an inoperative position, as shown in Fig. 4, whereupon the grinding of the edge of the form tool can be started, the grinding being interrupted when it reaches the intended new surface 141. The grinding can be started while the slide is in place, and it is merely necessary to move the slide out of the way when a cutting tool has ground the surface almost to the desired extent, the last few passes of the grind wheel being made after the slide has been moved out of the way. After the cutting is completed, the slide can again be used to check the cut by means of the scale on the slide or the fixture, to make sure that the newly made cut is at the correct distance from a parallel central plane of the form tool. If a form tool is to be sharpened which has no indication thereon as to the distance between the edge 14 and the radial plane of the form tool parallel thereto, then the operator may assume that the edge 14 of the tool to be sharpened is correctly spaced from reference to a parallel radial plane and the form tool after being mounted on member 17 is turned and the slide 30 moved back and forth until the straight edge 35 of the slide is parallel to the surface 14 of the form tool. The slide 30 is then secured in position and the form tool turned slightly in a clockwise direction in Fig. 2 until the worn portion of the cutting surface of the form tool is beyond the edge 35 of the slide, thus establishing the new proposed edge 141 as shown on Fig. 4, whereupon the grinding can be begun.

The fixture described may also be used to good advantage in connection with the manufacture of form tools for forming the gash therein. In such case, the ungashed form tool is mounted on the supporting bolt 17 and rigidly secured on the fixture and the slide is moved into a position in which the index 46 is opposite the graduation on the scale which represents the distance at which it is desired to space the surface 14 from a parallel axial plane of the form tool. The cutter may then be set according to the straight edge 35 of the slide, whereupon the slide is withdrawn and the cut made in the form tool.

It is not desired to limit this invention to the particular construction and arrangement shown, since obviously changes can be made within the scope of this invention. It is, for example, possible to use the fixture in the same manner as described if the same be turned through 90 degrees so that the edge 50 of the body portion is secured to the surface of the table 8.

The fixture described has the advantage that it greatly facilitates the proper sharpening or producing of the cutting surfaces on form tools. The fixture is of simple construction and can be easily used by any mechanic and by the use of the fixture as described the angle between the surface 14 of the form tool and the immediately adjacent portion of the periphery can be maintained uniform throughout the life of the form tool. By means of the fixture as shown, it will also be noted that the sharpening can be effected by means of that portion of the grinding implement 9 which travels upwardly in its rotation, so that the form tool is ground by means of an abrasive action toward the cutting edge of the form tool, thus forming a sharp and uniform cutting edge on the tool. The mounting of the form tool on the body portion of the fixture has the advantage that when the nut 21 is slightly loose, the form tool can be turned about its axis so as to bring the surface 14 or the surface to be formed 141 into alignment with the straight edge 35, and when thus positioned the form tool may be locked to the body portion of the fixture by turning the nut 21 without changing the adjustment of the form tool.

In the use of the fixture, it will be also obvious that if a form tool is to be worked upon, which can be more readily operated upon by mounting the same on the opposite side of the fixture, this change in the mounting is readily possible, since it is merely necessary to remove the bolt 17 and to insert it into its hole in the body portion of the fixture in the opposite direction, and similarly removing the slide 30 and placing it into the guideway or the opposite side of the upward projection 32 of the body portion. While I have shown the device for use in connection with cup grinding wheels, it will be obvious that any other suitable type of grinding wheel may be employed and the term "edge cutting implement" is herein used to indicate grind wheels of any type and milling or other cutting tools that may be employed for cutting the gash in the form tool.

I claim as my invention:

1. A fixture for supporting circular form tools on a machine having a table and a rotary cutting implement, said fixture including a body portion, means for rigidly securing said body portion to the table of the machine, means for securing a form tool to either side of said body portion, a slide having a straight edge arranged in position to be alined with the surface to be cut, guide means on both sides of said body portion with which said slide may cooperate for movement of the straight edge thereof toward and from the portion of the form tool which is to be cut by said implement, a scale on each side of said body portion, and indicating means on said slide for cooperation with either of said scales for determining the distance of said straight edge from an axial plane of the form tool extending parallel to the cut to be made.

2. A fixture for supporting circular form tools having central apertures, on a machine having a table and a rotary cutting implement, said fixture including a body portion, means for rigidly securing said body portion to the table of the machine, said body portion having flat surfaces on opposite sides thereof and having an aperture extending therethrough at a right angle to both of said surfaces, a bolt extending through said hole and adapted to extend through the central aperture of a form tool and being reversible to enable the form tool to be arranged at either side of said body portion, and means for centering a form tool on said bolt and for pressing said form tool against a side of said body portion for securely holding the same in place while it is subjected to the action of the rotary edge cutting implement, each of said opposite sides of said body portion having depressions about said hole into which projecting portions of a form tool may enter to enable a flat side portion of the form tool to be pressed against the side of said body portion, and a slide movable lengthwise of an edge of either of said flat surfaces and having a straight edge extending perpendicular to its direction of movement for alinement with the surface of a form tool which is to be cut and extend into operative relation to a form tool mounted on either of said flat surfaces.

3. A fixture for supporting circular form tools on a machine having a table and a rotary cutting implement, said fixture including a body portion, means for rigidly securing said body portion to the table of the machine, means for securing a form tool to either side of said body portion, a slide having a straight edge extending into a position to be alined with the surface to be cut on a form tool mounted on one of said sides, and guide means on both sides of said body portion with which said slide may cooperate for movement of the straight edge thereof toward and from alinement with the portion of the form tool which is to be cut by said implement, when said form tool is mounted on either side of said body portion.

ANTHONY J. DADDONA.

REFERENCES CITED

The following references are of record in the file of this patent:

UNITED STATES PATENTS

| Number | Name | Date |
| --- | --- | --- |
| 271,966 | Woerd | Feb. 6, 1883 |
| 727,981 | Lomasney | May 12, 1903 |
| 2,002,971 | Zimmerman | May 28, 1935 |
| 2,141,187 | Lehman | Dec. 27, 1938 |